US011420718B2

(12) United States Patent
Joseph et al.

(10) Patent No.: US 11,420,718 B2
(45) Date of Patent: Aug. 23, 2022

(54) AIRCRAFT TAIL ASSEMBLY

(71) Applicant: The Boeing Company, Chicago, IL (US)

(72) Inventors: Joel Kevin Joseph, Mill Creek, WA (US); Max Tyler Breedlove, Seal Beach, CA (US); Paul Diep, Bothell, WA (US); Peter John Newnham, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 208 days.

(21) Appl. No.: 16/832,176

(22) Filed: Mar. 27, 2020

(65) Prior Publication Data

US 2021/0300519 A1  Sep. 30, 2021

(51) Int. Cl.
*B64C 1/06* (2006.01)
*B64C 1/10* (2006.01)
*B64F 5/10* (2017.01)

(52) U.S. Cl.
CPC ............ *B64C 1/0685* (2020.01); *B64C 1/064* (2013.01); *B64C 1/069* (2013.01); *B64C 1/10* (2013.01); *B64F 5/10* (2017.01)

(58) Field of Classification Search
CPC ......... B64C 1/10; B64C 1/069; B64C 1/0683; B64C 1/064; B64C 1/065
See application file for complete search history.

(56) References Cited

U.S. PATENT DOCUMENTS

| 8,939,404 | B2* | 1/2015 | Sayilgan | B64C 1/068 244/119 |
| 9,481,443 | B2 | 11/2016 | Gonzalez Gozalbo et al. | |
| 2006/0060705 | A1* | 3/2006 | Stulc | B64C 1/069 244/119 |
| 2006/0101771 | A1* | 5/2006 | Holman | B64C 1/10 52/633 |
| 2007/0267541 | A1* | 11/2007 | Honorato Ruiz | B64C 9/02 244/87 |
| 2008/0067289 | A1* | 3/2008 | Meyer | B64C 1/064 244/131 |
| 2010/0258676 | A1* | 10/2010 | Gauthie | B64C 1/069 244/131 |
| 2010/0282905 | A1* | 11/2010 | Cazeneuve | B64C 1/069 244/120 |

(Continued)

*Primary Examiner* — Joshua J Michener
*Assistant Examiner* — Ryan Andrew Yankey
(74) *Attorney, Agent, or Firm* — Quinn IP Law

(57) ABSTRACT

An aircraft tail assembly includes an aft fuselage section secured to a forward fuselage section, and includes a stiffener-reinforced pivot bulkhead defined by separate parts secured together by a first set of splices. A longeron extends longitudinally along the aft and forward fuselage sections, and includes a discontinuity adjacent a peripheral edge of the pivot bulkhead. The aircraft tail assembly includes a second set of splices that overlie the discontinuity. One of the second set of splices extends laterally over the longeron to bridge the discontinuity adjacent the peripheral edge of the pivot bulkhead, and another of the second set of splices extends longitudinally along the longeron to secure the longeron to the pivot bulkhead adjacent the discontinuity. A chord engages the peripheral edge of the pivot bulkhead to facilitate transfers of force loads from the bulkhead along a load path that includes the longerons and the splices.

20 Claims, 5 Drawing Sheets

(56) References Cited

U.S. PATENT DOCUMENTS

| | | | | |
|---|---|---|---|---|
| 2011/0290940 | A1* | 12/2011 | Noebel | B64C 1/10 |
| | | | | 244/121 |
| 2014/0370227 | A1* | 12/2014 | Diep | B64D 45/00 |
| | | | | 428/66.4 |
| 2017/0291678 | A1* | 10/2017 | Jerstad | B64C 1/10 |
| 2017/0361915 | A1* | 12/2017 | McNamara | B64C 1/10 |
| 2019/0039711 | A1* | 2/2019 | Diep | B64C 1/12 |
| 2021/0031900 | A1* | 2/2021 | Partouche | B64C 1/061 |

\* cited by examiner

AIRCRAFT TAIL ASSEMBLY

FIELD OF THE DISCLOSURE

The present disclosure relates generally to construction of aircraft tail assemblies, and more particularly to structures including pivot bulkheads that support flight loads of horizontal stabilizers.

BACKGROUND OF THE DISCLOSURE

A fuselage comprises a main body structure of an aircraft, and is designed to house a flight crew, along with passengers and cargo. An unpressurized tail assembly, typically situated behind a rear pressure bulkhead, constitutes the rear end of the fuselage. Among other things, the tail assembly contains a pivot bulkhead to provide support of a horizontal stabilizer, and to transfer loads from the horizontal stabilizer through the bulkhead to structural components of the fuselage.

Various designs and installations of pivot bulkheads have been employed to accommodate transfers of flight control forces created by a horizontal stabilizer to fuselage components without incurring potential damage to the tail assembly. In relation to the pivot bulkhead, unpressurized fuselage sections abutting the bulkhead are a tail cone, generally referred to as an aft section, and a forward section, situated directly in front of and connected to, the aft section. The horizontal stabilizer is physically mounted and supported within the latter unpressurized fuselage sections. The pivot bulkhead is normally positioned at the joint of the aft and forward sections.

Typical aircraft tail assemblies, comprised of one-piece pivot bulkheads, have been associated with relatively burdensome installations. The use of a multi-piece bulkhead in combination with other structural splicing accommodations may improve manufacturing efficiencies, while reducing some of the complexities associated with installations of aircraft tail assemblies.

SUMMARY OF THE DISCLOSURE

In accordance with one example of the present disclosure, an aircraft tail assembly includes an aft fuselage section joined to a forward fuselage section. A pivot bulkhead is formed of separate parts secured together by a first set of splices, and includes a peripheral edge situated at an interior interface of the aft and forward fuselage sections. A longeron extends longitudinally through, and orthogonally relative to, the pivot bulkhead, and adjacent the peripheral edge thereof. The longeron includes a discontinuity adjacent the peripheral edge. The aircraft tail assembly also includes at least one of a second set of splices to bridge the discontinuity.

In accordance with another example of the present disclosure, an aircraft includes an aircraft tail assembly having an aft fuselage section joined to a forward fuselage section. A pivot bulkhead is formed of separate parts secured together by a first set of splices, and includes a peripheral edge situated at an interior interface of the aft and forward fuselage sections. A longeron extends longitudinally through, and orthogonally relative to, the pivot bulkhead, and adjacent the peripheral edge thereof. The longeron includes a discontinuity adjacent the peripheral edge. The aircraft tail assembly also includes at least one of a second set of splices to bridge the discontinuity.

In accordance with yet another example of the present disclosure, a method of making an aircraft tail assembly includes steps of forming an aft fuselage section and a forward fuselage section, and joining the aft and forward fuselage sections together. The method further includes forming a pivot bulkhead of separate parts, the separate parts being secured together by a first set of splices, and configuring and placing a peripheral edge of the pivot bulkhead at an internal interface of the aft and forward fuselage sections. The method further includes configuring and placing the peripheral edge to define an internal interface of the aft and forward fuselage sections, and forming the pivot bulkhead of separate parts to be secured together by a first set of splices. The method further includes forming and placing a longeron longitudinally along both aft and forward fuselage sections, such that the longeron extends through, and orthogonally relative to, the pivot bulkhead, and adjacent the peripheral edge thereof, with the longeron including a discontinuity adjacent the peripheral edge. Finally, the method provides that at least one of a second set of splices bridges the discontinuity.

The features, functions, and advantages disclosed herein can be achieved independently in various examples, or may be combined in yet other examples, the details of which may be better appreciated with reference to the following description and drawings.

It should be understood that referenced drawings are not necessarily to scale, and that disclosed examples are illustrated only schematically. Aspects of the disclosed examples may be combined with or substituted by one another, and/or within various systems and environments that are neither shown nor described herein. As such, it should be understood that the following detailed description is only exemplary, and thus not intended to be limiting in application or use.

DETAILED DESCRIPTION OF THE INVENTION

The following detailed description addresses at least an apparatus and a method for carrying out the disclosure. Actual scope of the disclosure is as defined in the appended claims.

Figure 1:
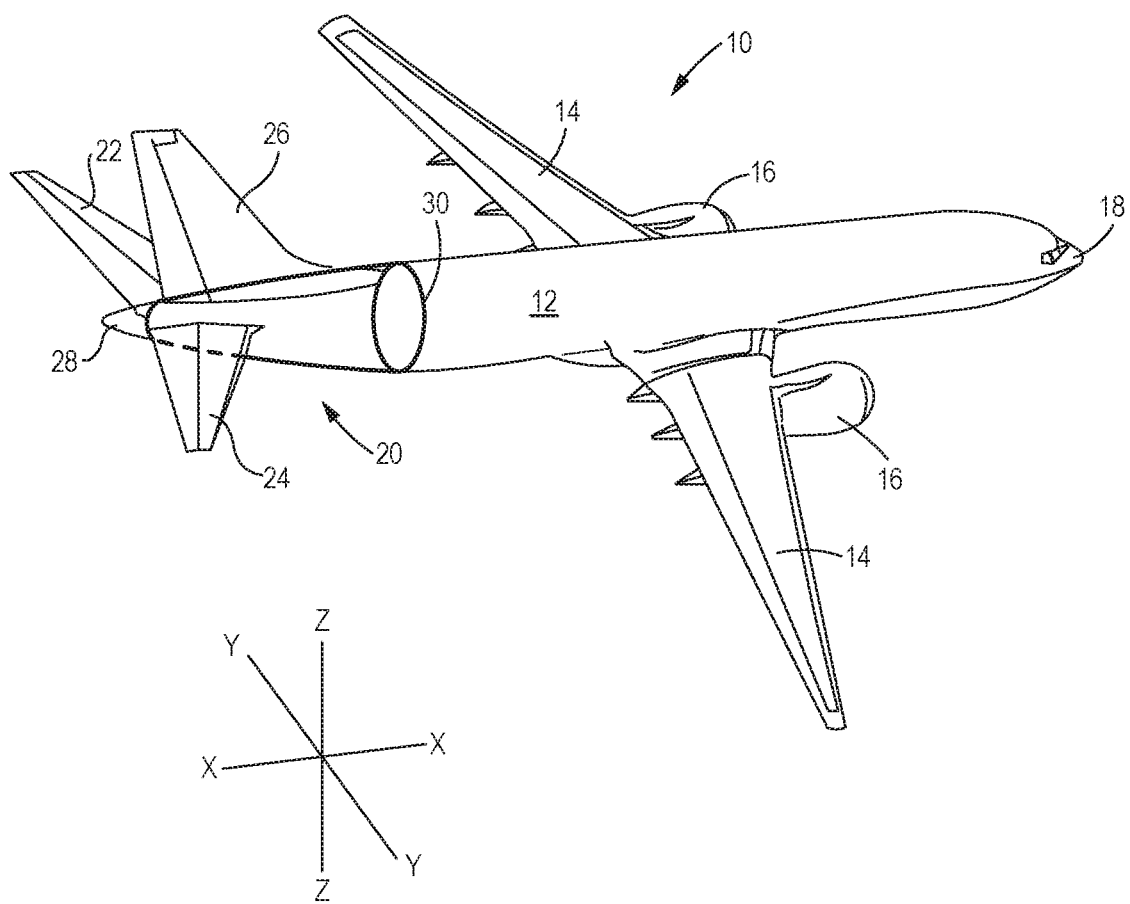
FIG. 1 is a perspective view of a commercial aircraft, including a rear fuselage portion that incorporates a pivot bulkhead assembly constructed according to examples of the present disclosure.

FIG. 1 is a perspective view of an aircraft 10, which may be used for commercial passenger transport. The aircraft 10 includes a fuselage 12, and left and right wings 14 extending laterally from the fuselage 12. Left and right engines 16 are supported on each of the left and right wings 14, respectively. The aircraft 10 includes a nose 18, and a tail assembly 20. The tail assembly 20 includes a left horizontal stabilizer 22, a right horizontal stabilizer 24, and a vertical stabilizer 26, all functional flight controls of the aircraft 10, as will be appreciated by those skilled in the art. FIG. 1 also includes three mutually orthogonal Cartesian reference axes reflective of three dimensional space, each axis representing one of longitudinal (X-X), lateral (Y-Y), or vertical (Z-Z) orientations. Various components of the aircraft 10 are described herein with respect to the latter orientations. Particular reference to left or right sides of the described components will be understood as being viewed in a direction facing the nose 18 of the aircraft 10.

Figure 2:
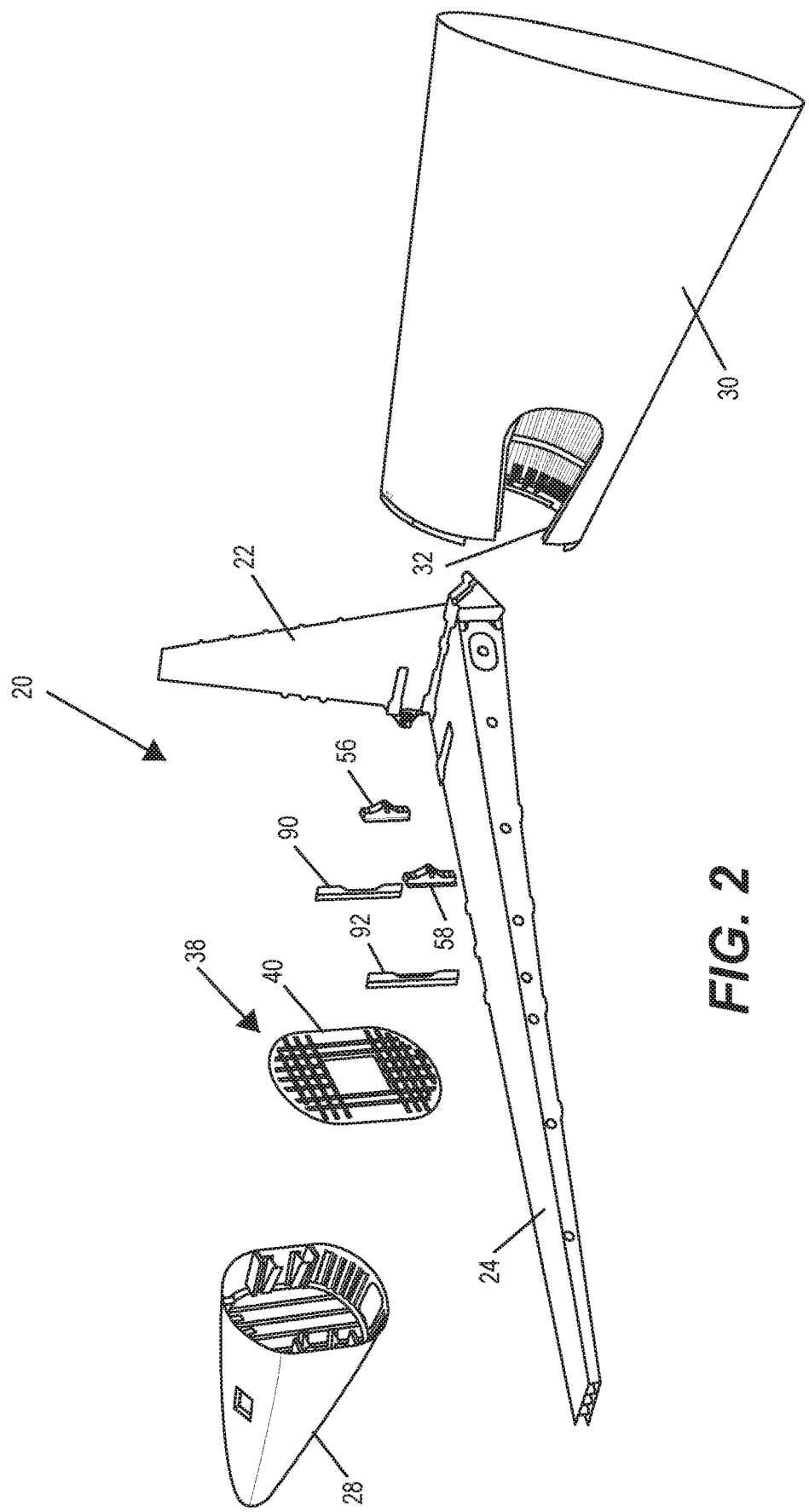
FIG. 2 is an exploded perspective view of the rear fuselage portion of FIG. 1.

FIG. 2 is an exploded perspective view of the tail assembly 20 of the aircraft 10. The tail assembly 20 defines a rear end portion of the fuselage 12 (FIG. 1), and includes the left and right horizontal stabilizers 22, 24, supported in two adjoining rear fuselage sections 28, 30. Thus, an aft fuselage section 28, also referred to as a tail cone, and a forward fuselage section 30 constitute two fuselage sections of the tail assembly 20, joined together at an interior interface with a pivot bulkhead 38. The forward fuselage section 30 includes horizontal stabilizer openings 32 for accommodating the left and right horizontal stabilizers 22, 24. In the example presented, a peripheral edge 40 (FIG. 2) of the pivot bulkhead 38 is coterminous with, and thus in part defines, the assembled interface or joint (not shown) of the assembled aft and forward fuselage sections 28, 30. Those skilled in the art will appreciate that the assembled bulkhead 38, is situated orthogonally to the fuselage sections 28, 30, and thus not only enhances the strength of the joint at the peripheral edge 40, but also provides a primary load path for flight forces imposed on the tail assembly 20 by the horizontal stabilizers 22, 24.

Figure 3:
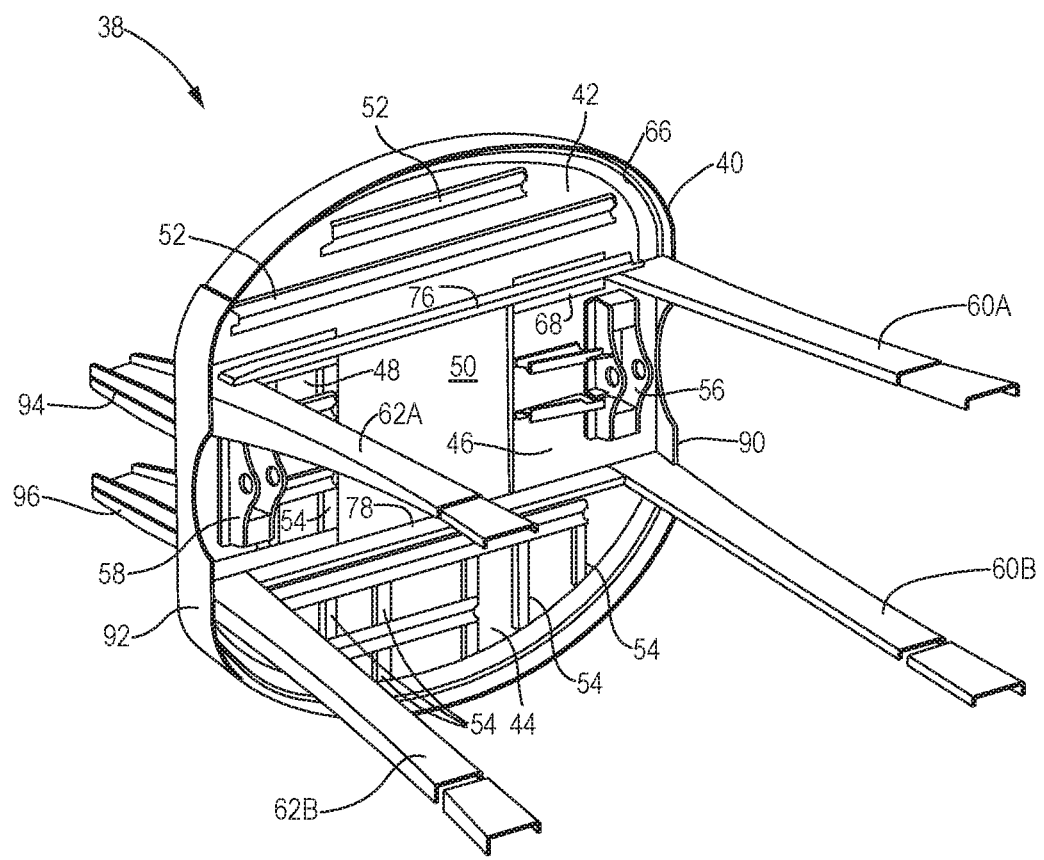
FIG. 3 is a rearward facing perspective view of a pivot bulkhead constructed according to an example of the present disclosure.

Referring also to FIG. 3, specific details of the pivot bulkhead 38 are shown in a forward-facing view. The bulkhead 38 is formed as a multi-piece structure including an upper header 42, a lower header 44, a left header support 46 and a right header support 48. The left and right header supports 46, 48 are fixed to, and physically secure together, the upper and lower headers 42, 44. A bulkhead opening 50, framed by the upper and lower headers and the left and right header supports, permits access to interior tail plane structures including the horizontal stabilizers 22, 24 (FIG. 2), as well as to the left and right side pivot fittings 56, 58. The pivot fittings are rigidly secured to the bulkhead 38, and the horizontal stabilizers are supported on the pivot fittings via pivot pins (not shown) to accommodate flight control movements of the horizontal stabilizers within the tail assembly 20.

Vertically spaced (horizontal) stiffeners 52 and laterally spaced (vertical) stiffeners 54 interconnect with one another to form a generally cross hatched array of stiffeners to impart strength to the assembled bulkhead 38. It will be appreciated that the bulkhead 38 is designed to receive and absorb flight forces transferred from the horizontal stabilizers 22, 24 via the pivot fittings 56, 58. While the bulkhead 38 of the example shown herein contains only horizontal and vertical stiffeners 52, 54, in other examples the support members may have other positions and shapes that provide structural support for the bulkhead 38. Similarly, in yet other examples the horizontal stiffeners 52 may be situated on the forward side of the bulkhead, while the vertical stiffeners 54 may be situated on the aft side of the bulkhead, or vice versa.

FIG. 3 reveals a pair of left side upper and lower longerons 60A and 60B, along with a corresponding laterally spaced pair of right side upper and lower longerons 62A and 62B. Each respective pair extends through, forward and aft, of the pivot bulkhead 38. The longerons are designed to impart strength to the fuselage, including providing load support of areas adjacent to the horizontal stabilizer openings 32 of the forward fuselage section 30 (FIG. 2). With respect to imparting strength to the horizontal stabilizer openings, the longerons are affixed directly above and below the openings 32, and thus reinforce the openings 32 sufficiently to permit them to react fuselage loads.

FIG. 3 further reveals a pair of left and right side T-chords 90 and 92, initially depicted in the exploded tail assembly view of FIG. 2. The T-chords frame the right and left header supports 46, 48 of the pivot bulkhead 38 to impart additional rigidity and strength to the bulkhead for handling load transfers from the horizontal stabilizers through the pivot fittings 56, 58. Although the T-chords 90 and 92 have T-shaped cross-sections, as shown, the latter elements may incorporate other cross-sections such as L-shaped cross-sections, for example, without compromising efficacy.

Figure 4A:
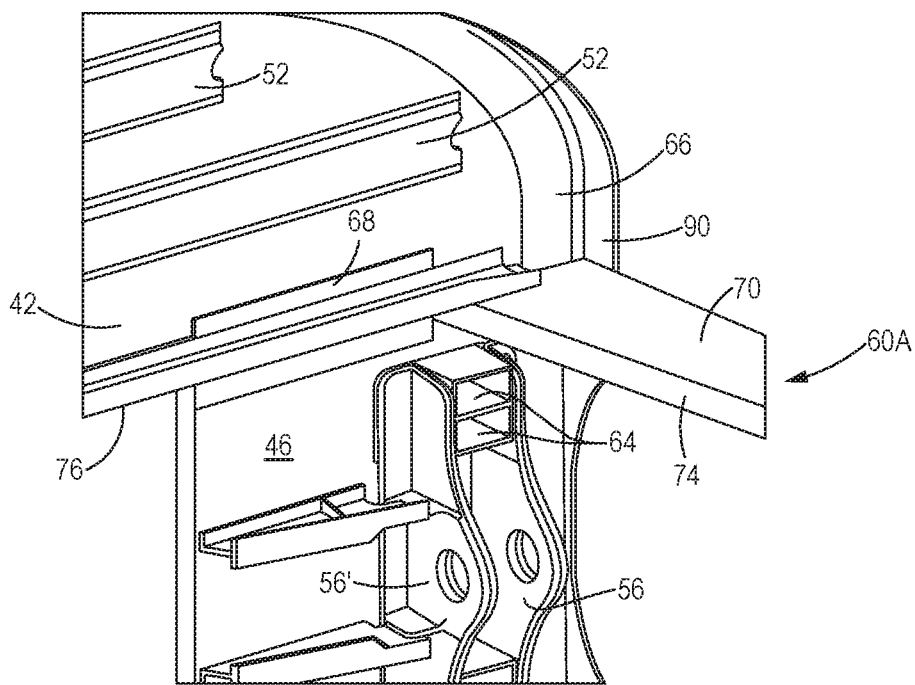
FIG. 4A is an enlarged view of a portion of the view of FIG. 3.
Figure 4B:
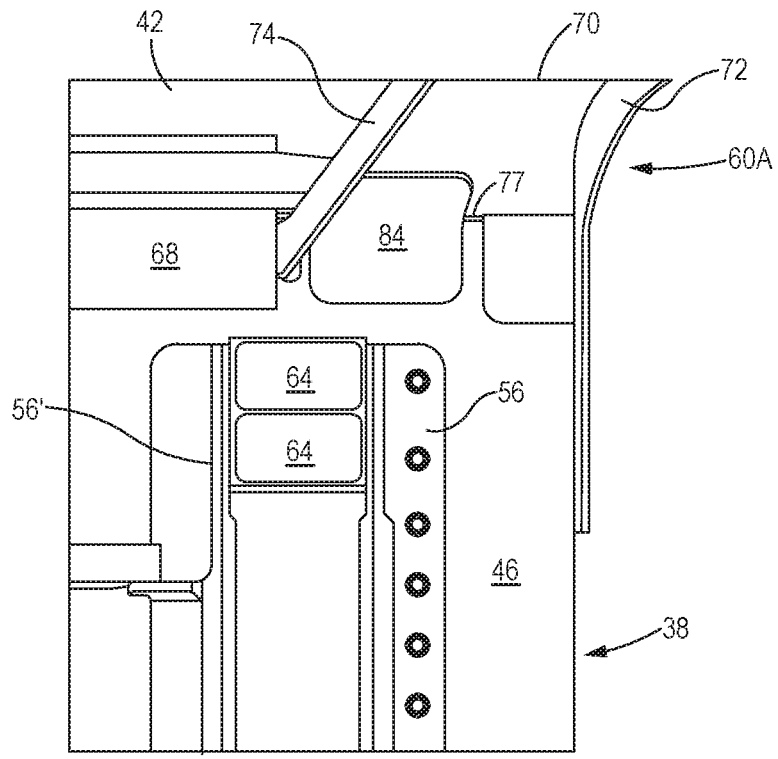
FIG. 4B is an enlarged view of the portion of FIG. 4A, as seen from a different angle.

Referring now also to FIGS. 4A and 4B, a bulkhead splice 68 may be described as one type of splice of a first set of splices. The bulkhead splice 68 is utilized to connect each of the multi-piece bulkhead parts together; i.e. the upper and lower headers 42, 44 are secured by pivot bulkhead splices 68 to each of the left and right header supports 46, 48, although only the splice 68 between the upper header 42 and the left header support 46 is shown. Each splice 68 effectively closes and/or bridges gaps 77 (FIG. 4B) that exist between the assembled upper and lower headers 42, 44 and left and right header supports 46, 48. Finally, the peripheral edge 40 (FIG. 2) of the pivot bulkhead 38 is encased by a bulkhead chord 66 (FIG. 4A) to impart strength to the assembled multi-piece bulkhead structure.

Referring now particularly to FIGS. 3 and 4B, although specific attributes of only one longeron (i.e. longerons 60A) are shown in FIG. 4B, it will be appreciated that each of the longerons 60A, 60B and 62A, 62B comprises a channel-shaped cross-section that includes a laterally extending web 70 having two vertically oriented integral chords, i.e. an outer chord 72 and an inner chord 74. As such, the longerons work in concert with the bulkhead 38 to transfer flight loads from the horizontal stabilizers 22, 24 (FIG. 2) to the aft and forward fuselage sections 28, 30. The lateral and vertical stiffeners 52, 54 (FIG. 3), as well as upper and lower sill beams 76, 78 (FIG. 3) which frame the tail plane access opening 50, are all part of a structural system designed to facilitate transfers of horizontal stabilizer-imposed flight loads. Indeed, FIGS. 3 and 4A reveal that the upper sill beam 76 is tied into the left side upper longeron 60A, as part of the accommodation of critical load paths.

FIGS. 4A and 4B provide enlarged forward-facing partial views of the bulkhead 38 (FIG. 3), and, among other things, each displays gussets 64 utilized to support the pivot fittings 56, 58, including the pair of such gussets 64 situated between left side pivot fittings 56 and 56' (FIG. 4B). In addition, with respect to management of critical load paths, it will be noted that a longeron clip 84 (FIG. 4B), described herein as one of a second set of splices, can be applied to the each of the longerons 60A, 60B, 62A, and 62B (FIG. 3). Each longeron clip 84 may be utilized to tie the underside of the web 70 of each longeron (e.g. longeron 60A of FIG. 4B) to each header support 46, 48 of the multi-piece pivot bulkhead 38.

Figure 5A:
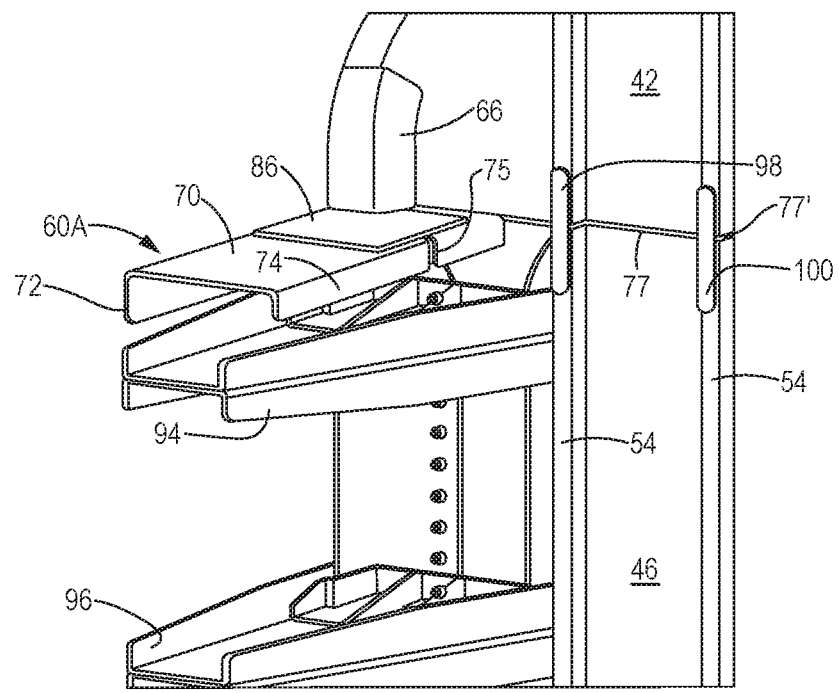
FIG. 5A is a forward facing perspective view of a portion of the pivot bulkhead of FIG. 3.
Figure 5B:
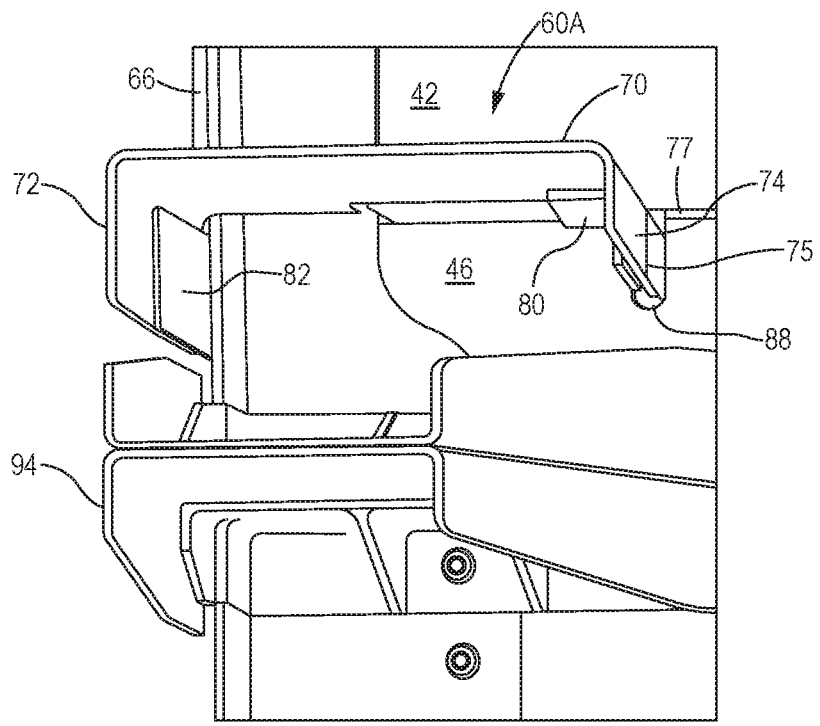
FIG. 5B is an enlarged view of the portion of FIG. 5A, as seen from a different angle.

FIGS. 5A and 5B display left-side rear-facing partial views of the pivot bulkhead 38; i.e. views with orientations diametrically opposite the views of FIGS. 4A and 4B. Thus, on the rear-side of the bulkhead 38, left-side upper and lower H-shaped intercoastal support members 94, 96 are utilized to reinforce the bulkhead 38 in regions adjacent the longerons, such as under the longeron 60A depicted in both figures. In FIG. 5A, it will be noted that another type of the second set of splices, a longeron web splice 86, may be affixed to an upper side of the longeron web 70, and to extend over a longeron discontinuity 75 to close and/or bridge together forward and aft portions of the longeron. Within this disclosure, each discontinuity 75 is defined as a laterally extending physical break or gap in an otherwise continuous longitudinally extending longeron structure, which includes each web 70, each outer chord 72, and each inner chord 74. Each discontinuity 75 defines an abutting forward and aft portion of each longeron that is closed and/or "bridged" by at least one of the second set of splices as herein defined. Incidentally, it should also be noted that the above-described bulkhead "chord" 66, which encases the peripheral edge 40 of the pivot bulkhead 38, is to be distinguished from the longeron "chords" 72, 74.

In FIG. 5B, yet another of the second set of splices, identified as an inner chord splice 80, extends laterally along the underside of both the web 70 and the inner longeron chord 74 to close and/or bridge each longeron discontinuity 75. It will be appreciated that various gaps and openings may be provided in the pivot bulkhead 38, such as an opening 88 in the left header support 46 to accommodate passage of the web 70 and inner chord 74 of the longeron 60A through the left header support 46.

Continuing reference to FIG. 5B, yet another of the second set of splices, called a longeron strap 82, extends longitudinally across the discontinuity 75, along the outer chord 72 of the longeron. The longeron strap 82 also effectively closes and/or bridges the longeron discontinuity 75, and secures the longeron outer chord 72 to the bulkhead chord 66 adjacent the discontinuity 75, if desired.

Finally, referring back to FIG. 5A, an additional type of the first set of splices is herein described as a vertical stiffener splice. Thus, a pair of vertical stiffener splices 98, 100 is shown to extend vertically, so as to bridge horizontal gaps 77' between upper and lower portions of the vertical stiffeners 54, similar to the manner in which splices 68 bridge the gaps 77 described above in reference to the upper and lower headers 42, 44 and respective left and right header supports 46, 48 (FIG. 3). Although the vertical stiffener splices 98, 100 are shown as having flat cross-sections, they may have other cross-sectional shapes, including L-shaped, for example. As with respect to all of the above-described splices, it will be appreciated that the described vertical stiffener splices 98, 100 are also designed to assist in carrying flight loads created by the horizontal stabilizers and ultimately transferred from the tail assembly to structural fuselage components, such as and including the longerons 60A, 60B, 62A, and 62B and the intercoastal support members 94, 96.

Throughout this disclosure, materials of each of the aircraft components, including bulkhead, longerons and the variously described splices, have been contemplated as consisting of carbon fiber reinforced plastic composites. Alternatively, the principles described herein are fully applicable to other component materials, including aluminum alloys, such as titanium aluminum, etc.

A method of making an aircraft tail assembly 20 may include steps of forming an aft fuselage section 28 and a forward fuselage section 30, and joining the aft and fuselage sections 28, 30 at an interface or joint. The method may further include forming the pivot bulkhead 38 of separate parts 42, 44, 46, 48 secured together by a first set of splices 68, 98, 100 and configuring and internally placing the peripheral edge 40 of the pivot bulkhead at the interface or joint of the aft and forward fuselage sections 28, 30.

The method may further include forming and placing a longeron 60A, 60B and 62A, 62B longitudinally along both aft and forward fuselage sections 28, 30, such that the longeron extends through, and orthogonally relative to, the pivot bulkhead 38, and adjacent the peripheral edge 40 thereof, and with the longeron including a discontinuity 75 positioned adjacent the peripheral edge 40.

The method may further include providing at least one of a second set of splices 80, 82, 84, 86 to bridge the discontinuity 75, and may further include securing a bulkhead chord 66 to the peripheral edge 40 of the pivot bulkhead 38.

Variations and modifications of the foregoing are within the scope of the present disclosure. It is understood that the examples disclosed and defined herein extend to all alternative combinations of two or more of the individual features mentioned or evident from the text and/or drawings. Whether presently contemplated, each different combination constitutes various alternative aspects of the present disclosure. The examples described herein explain the best modes known for practicing the disclosure and will enable others skilled in the art to utilize the disclosure. The claims are to be construed to include alternative examples to the extent permitted by law in view of the prior art.

Clause 1. An aircraft tail assembly including an aft fuselage section joined to a forward fuselage section, the aircraft tail assembly comprising: a pivot bulkhead formed of separate parts secured together by a first set of splices, the pivot bulkhead having a peripheral edge positioned at an interface of the aft and forward fuselage sections; a longeron extending longitudinally through, and orthogonally relative to, the pivot bulkhead adjacent the peripheral edge thereof, the longeron having a discontinuity adjacent the peripheral edge; wherein the aircraft tail assembly includes at least one of a second set of splices to bridge the discontinuity.

Clause 2. The aircraft tail assembly of clause 1, further including a bulkhead chord secured to the peripheral edge of the pivot bulkhead to transfer flight force loads from the pivot bulkhead to the aft and forward fuselage sections.

Clause 3. The aircraft tail assembly of clauses 1 or 2, wherein the longeron is channel-shaped, comprising a web that extends laterally, and having an outer chord and an inner chord, both extending vertically, and wherein one of the second set of splices comprises a longeron inner chord splice that extends laterally over the web and the inner chord of the longeron to bridge the discontinuity.

Clause 4. The aircraft tail assembly of any one of clauses 1-3, wherein one of the second set of splices comprises a longeron strap that extends longitudinally over the discontinuity of the longeron.

Clause 5. The aircraft tail assembly of any one of clauses 1-4, wherein the longeron strap secures the longeron to the pivot bulkhead.

Clause 6. The aircraft tail assembly of any one of clauses 1-5, wherein one of the second set of splices comprises a longeron clip, which extends longitudinally along the longeron, and secures the longeron to the pivot bulkhead adjacent the discontinuity.

Clause 7. The aircraft tail assembly of any one of clauses 1-6, wherein one of the second set of splices comprises a web splice plate that extends longitudinally along the web of the longeron.

Clause 8. The aircraft tail assembly of any one of clauses 2-7, wherein the longeron, the pivot bulkhead, the bulkhead chord, and wherein the first set of splices and the second sets of splices are each formed of a composite fiber reinforced plastic.

Clause 9. The aircraft tail assembly of any one of clauses 1-8, wherein the longeron borders a horizontal stabilizer opening of the forward fuselage section, and is configured to react fuselage loads at the horizontal stabilizer opening.

Clause 10. The aircraft tail assembly of any one of clauses 1-9, wherein the pivot bulkhead comprises an upper header and a lower header, and a left header support and a right header support, each header support fixed to left and right sides, respectively, of the upper and lower headers.

Clause 11. The aircraft tail assembly of clause 10 wherein the each of the pivot bulkhead upper and lower headers and left and right header supports includes a plurality of vertical and lateral stiffeners.

Clause 12. The aircraft tail assembly of clauses 10 or 11, further including a T-chord framing each of the left and right header supports.

Clause 13. The aircraft tail assembly of any one of clauses 10-12, wherein the upper header and the lower header, along with the left header support and the right header support collectively frame a tail plane access opening.

Clause 14. The aircraft tail assembly of any one of clauses 10-13, wherein a left bulkhead T-chord frames the pivot bulkhead at the left header support, and a right bulkhead T-chord frames the pivot bulkhead at the right header support.

Clause 15. The aircraft tail assembly of any one of clauses 3-14, wherein the longeron strap bridges the discontinuity on the outer chord of the longeron.

Clause 16. The aircraft tail assembly of any one of clauses 3-15, wherein the an inner chord splice is positioned on an underside of the longeron and bridges the discontinuity on the inner chord of the longeron.

Clause 17. An aircraft comprising: an aircraft tail assembly including an aft fuselage section joined to a forward fuselage section; a pivot bulkhead formed of separate parts secured together by a first set of splices, the pivot bulkhead having a peripheral edge positioned at an interface of the aft and forward fuselage sections; a longeron extending longitudinally through, and orthogonally relative to, the pivot bulkhead adjacent the peripheral edge thereof, the longeron including a discontinuity adjacent the peripheral edge; wherein the aircraft tail assembly includes at least one of a second set of splices to bridge the discontinuity.

Clause 18. The aircraft of clause 17, wherein the aircraft tail assembly further includes a bulkhead chord secured to the peripheral edge of the pivot bulkhead to transfer flight force loads from the pivot bulkhead to aft and forward fuselage sections, and wherein the longeron, the pivot bulkhead, the bulkhead chord, and the first set of splices and the second set of splices are each formed of a composite fiber reinforced plastic.

Clause 19. A method of making an aircraft tail assembly, the method including steps of: forming an aircraft tail assembly to include an aft fuselage section and a forward fuselage section, and joining the aft and fuselage sections together; forming a pivot bulkhead of separate parts, the separate parts being secured together by a first set of splices, the pivot bulkhead having a peripheral edge; configuring and placing the peripheral edge at an internal interface of the aft and forward fuselage sections; forming and placing a longeron longitudinally along both aft and forward fuselage sections, such that the longeron extends through, and orthogonally relative to, the pivot bulkhead, and adjacent the peripheral edge thereof, the longeron including a discontinuity positioned adjacent the peripheral edge; and providing at least one of a second set of splices to bridge the discontinuity.

Clause 20. The method of clause 19, further including a step of securing a bulkhead chord to the peripheral edge of the pivot bulkhead.

The invention claimed is:

1. An aircraft tail assembly including an aft fuselage section joined to a forward fuselage section, the aircraft tail assembly comprising:
a pivot bulkhead formed of separate parts secured together by a first set of splices, the pivot bulkhead having a peripheral edge positioned at an interface of the aft and forward fuselage sections;
a longeron extending longitudinally through, and orthogonally relative to, the pivot bulkhead adjacent the peripheral edge thereof, the longeron having a discontinuity adjacent the peripheral edge;
wherein the longeron includes a web that extends laterally and an inner chord that extends vertically;
wherein the aircraft tail assembly includes at least one of a second set of splices extending laterally over the web and the inner chord of the longeron to bridge the discontinuity.

2. The aircraft tail assembly of claim 1, further including a bulkhead chord secured to the peripheral edge of the pivot bulkhead to transfer flight force loads from the pivot bulkhead to the aft and forward fuselage sections.

3. The aircraft tail assembly of claim 2, wherein the longeron is channel-shaped and includes an outer chord extending vertically, and wherein one of the second set of splices comprises a longeron inner chord splice that extends laterally over the web and the inner chord of the longeron to bridge the discontinuity.

4. The aircraft tail assembly of claim 3, wherein one of the second set of splices comprises a longeron strap that extends longitudinally over the discontinuity of the longeron.

5. The aircraft tail assembly of claim 4, wherein the longeron strap secures the longeron to the pivot bulkhead.

6. The aircraft tail assembly of claim 3, wherein one of the second set of splices comprises a longeron clip, which extends longitudinally along the longeron, and secures the longeron to the pivot bulkhead adjacent to the discontinuity.

7. The aircraft tail assembly of claim 3, wherein one of the second set of splices comprises a web splice plate that extends longitudinally along the web of the longeron.

8. The aircraft tail assembly of claim 2, wherein the longeron, the pivot bulkhead, the bulkhead chord, and wherein the first set of splices and the second sets of splices are each formed of a composite fiber reinforced plastic.

9. The aircraft tail assembly of claim 1, wherein the longeron borders a horizontal stabilizer opening of the forward fuselage section, and is configured to react fuselage loads at the horizontal stabilizer opening.

10. The aircraft tail assembly of claim 1, wherein the pivot bulkhead comprises an upper header and a lower header, and a left header support and a right header support, each header support fixed to left and right sides, respectively, of the upper and lower headers.

11. The aircraft tail assembly of claim 10 wherein the each of the pivot bulkhead upper and lower headers and left and right header supports includes a plurality of vertical and lateral stiffeners.

12. The aircraft tail assembly of claim 10, further including a T-chord framing each of the left and right header supports.

13. The aircraft tail assembly of claim 10, wherein the upper header and the lower header, along with the left header support and the right header support collectively frame a tail plane access opening.

14. The aircraft tail assembly of claim 10, wherein a left bulkhead T-chord frames the pivot bulkhead at the left header support, and a right bulkhead T-chord frames the pivot bulkhead at the right header support.

15. The aircraft tail assembly of claim 5, wherein the longeron strap bridges the discontinuity on the outer chord of the longeron.

16. The aircraft tail assembly of claim 3, wherein the inner chord splice is positioned on an underside of the longeron and bridges the discontinuity on the inner chord of the longeron.

17. An aircraft comprising:
- an aircraft tail assembly including an aft fuselage section joined to a forward fuselage section;
- a pivot bulkhead formed of separate parts secured together by a first set of splices, the pivot bulkhead having a peripheral edge positioned at an interface of the aft and forward fuselage sections;
- a longeron extending longitudinally through, and orthogonally relative to, the pivot bulkhead adjacent the peripheral edge thereof, the longeron including a discontinuity adjacent to the peripheral edge;
- wherein the aircraft tail assembly includes at least one of a second set of splices to bridge the discontinuity;
- wherein the pivot bulkhead comprises an upper header, a lower header, a left header support and a right header support; and
- wherein the left header support and the right header support are fixed to left and right sides, respectively, of the upper header and the lower header.

18. The aircraft of claim 17, wherein the aircraft tail assembly further includes a bulkhead chord secured to the peripheral edge of the pivot bulkhead to transfer flight force loads from the pivot bulkhead to aft and forward fuselage sections, and wherein the longeron, the pivot bulkhead, the bulkhead chord, and the first set of splices and the second set of splices are each formed of a composite fiber reinforced plastic.

19. A method of making an aircraft tail assembly, the method including steps of:
- forming an aircraft tail assembly to include an aft fuselage section and a forward fuselage section, and joining the aft and fuselage sections together;
- forming a pivot bulkhead of separate parts, the separate parts being secured together by a first set of splices, the pivot bulkhead having a peripheral edge, the pivot bulkhead including an upper header, a lower header, a left header support and a right header support;
- configuring and placing the peripheral edge at an internal interface of the aft and forward fuselage sections;
- forming and placing a longeron longitudinally along both aft and forward fuselage sections, such that the longeron extends through, and orthogonally relative to, the pivot bulkhead, and adjacent the peripheral edge thereof, the longeron including a discontinuity positioned adjacent the peripheral edge;
- providing at least one of a second set of splices to bridge the discontinuity; and
- positioning a left header support and a right header support to left and right sides, respectively, of the upper header and the lower header.

20. The method of claim 19, further including a step of securing a bulkhead chord to the peripheral edge of the pivot bulkhead.

* * * * *